Patented Oct. 29, 1935

2,019,207

UNITED STATES PATENT OFFICE 2,019,207

VULCANIZED RUBBER SOLUTION

Walter Alexander, Hamburg, Germany

No Drawing. Application January 10, 1934, Serial No. 706,152. In Germany February 6, 1933

5 Claims. (Cl. 134—17)

This invention relates to vulcanized rubber solutions.

Rubber vulcanized with sulphur or sulphur chloride is not soluble in ordinary solvents. For example, if rubber solved in mineral oil or heavy petrol is treated with sulphur or sulphur chloride, it will not be possible to dissolve appreciable quantities of the vulcanized rubber, as it precipitates almost exclusively in the form of lumps or powder.

It has been found that rubber acts quite differently if first depolymerized by heating to 200° to 300° C. until a sirupy consistency is obtained, then dissolved in certain solvents, such as xylene, toluene, benzene or amyl acetate, and finally heated with sulphur to vulcanizing temperature, either to the boiling point of the solvent or under increased pressure. Instead of sulphur, sulphur chloride, without the application of heat or pressure, may be used for vulcanizing the depolymerized rubber. For instance, if a solution of rubber (depolymerized as described herein) in xylene is heated for some time at the boiling point of xylene near 140° centigrade while simultaneously, sulphur and, eventually, a vulcanization accelerator are added, a sulphur-rubber composition will be obtained which does not separate from the solution. After evaporation of the solvent there remains a dry substance which when applied in a thin layer forms a varnish-like elastic coating which will not break on a flexible support. Once precipitated from the solution, this sulphur-rubber composition does not dissolve again in its solvent and discloses all the valuable properties of vulcanized rubber, i. e., it is stable with respect to atmospheric influences, diluted acids and alkalies, repels water, and is flexible and elastic.

In producing these rubber solutions one may proceed from crude rubber or vulcanized old rubber which is depolymerized by heating and then treated in the manner described. In this way rubber solutions are obtainable which do not contain free sulphur. Being free from oxygen and adhering to metals quite well, they constitute anti-corroding agents of unsurpassable perfection. A further use of the rubber vulcanization solution obtained in the manner described, in which the hardness of the sulphurized rubber can be regulated up to hard rubber quality by dosing the sulphur addition, consists in impregnating fibers, fabrics and paper. Whereas fabrics impregnated with rubber had hitherto to be vulcanized after impregnation to remove adhesiveness and to render them solvent-proof, fabrics impregnated with sulphur-rubber compositions according to this invention are non-adhesive and petrol-proof, since the adhering rubber is vulcanized already. Fibers coated with vulcanized rubber compositions can be made into moisture-proof fabrics. Paper impregnated with vulcanized rubber compositions acquires valuable properties, such as imperviousness to water, and discloses good electrical insulation.

It has been proposed already to heat rubber to 120° centigrade for 10 hours, to add sulphur to the rubber thus treated which is dissolved in nitrobenzene and to vulcanize it by further heating up to 150° centigrade. In this way, however, only a slightly turbid dark liquid containing free sulphur is produced which is absolutely unsuited to serve as coating varnish.

The vulcanized rubber solutions according to my invention can, on the contrary, be mixed in any proportion with varnish, fatty oils and lacquers for impregnation, coatings or dipping varnishes, into which rubber may thus be incorporated in a simple manner without rendering them adhesive. Furthermore, their elasticity and imperviousness to moisture is increased thereby.

If sulphur chloride is added to a xylene solution of depolymerized rubber, a sulphur chloride-rubber composition will be formed which does not precipitate from the xylene solution, but which, after addition of a siccative, will, after evaporation of the xylene, remain behind as a dry lacquer-like coating, provided a sufficient amount of sulphur chloride has been added. This sulphur chloride-rubber solution discloses similar properties as the solution prepared with sulphur and can be used for the same purposes, unless the chlorine content is undesirable.

The following examples serve to explain the invention:

I 100 g. rubber, either crude or vulcanized old rubber, are heated to 200°–300° centigrade until a sirupy consistency has been attained, then dissolved in 900 g. xylene and heated with 16 g. sulphur 16 to 20 hours. The conversion is completed when a sample indicates that sulphur is not precipitated any more and a dry residue remains after evaporation of the xylene.

II 100 g. rubber depolymerized according to Example I are dissolved in 900 g. xylene and mixed with 15 g. sulphur chloride whereupon combination of the sulphur chloride and rubber will instantaneously take place with slight heating.

Into the solution prepared according to Examples I and II metal bodies, cotton fibers, fabrics or paper are dipped and dried in the air or at a moderate heat at about 100° centigrade until the coating is non-adhesive. Instead of dipping the objects into the solution, the latter may be applied thereto by brushing or spraying.

III 100 g. of the solution prepared according to Examples I or II are mixed with 20 g. varnish or with 50 g. or 100 g. oil varnish or nitro varnish.

These mixtures may be used for coating or as dipping varnishes.

Fabrics may be impregnated with the varnish-containing rubber solutions and then dried.

I claim:—

1. The process of forming a rubber colution which comprises depolymerizing rubber at 200° to 300° C. until a sirupy consistency is attained, then dissolving and vulcanizing said depolymerized rubber in a solvent for said depolymerized rubber and the rubber product resulting from the said vulcanizing.

2. The process of treating rubber which previously has been depolymerized by heating at 200° to 300° C. until a sirupy consistency is attained, for the purpose of forming rubber solution, which process comprises dissolving said depolymerized rubber in a liquid which is a solvent for said depolymerized rubber and for the rubber product which results from the action of a vulcanizing agent on the depolymerized rubber dissolved in said liquid, and subjecting the said depolymerized rubber in solution in said liquid to the action of a vulcanizing agent.

3. The process of treating rubber which previously has been depolymerized by heating at 200° to 300° C. until a sirupy consistency is attained, for the purpose of forming rubber solution, which process comprises dissolving said depolymerized rubber in a liquid which is a solvent for said depolymerized rubber and for the rubber product which results from the combined action of sulphur and heat on the depolymerized rubber dissolved in said liquid, and subjecting the said depolymerized rubber in solution in said liquid to the action of sulphur while heating.

4. The process of treating rubber which previously has been depolymerized by heating at 200° to 300° C. until a sirupy consistency is attained, for the purpose of forming rubber solution, which process comprises dissolving said depolymerized rubber in a liquid which is a solvent for said depolymerized rubber and for the rubber product which results from the action of sulphur chloride on the depolymerized rubber dissolved in said liquid, and subjecting the said depolymerized rubber in solution in said liquid to the action of sulphur chloride.

5. The process of treating rubber which previously has been depolymerized by heating it in solid condition at 200° to 300° C. until a sirupy consistency is attained, for the purpose of forming rubber solution, which process comprises subjecting said depolymerized rubber to the action of a vulcanizing agent while said depolymerized rubber is dissolved in a liquid solvent which is a solvent for said depolymerized rubber and for the rubber product resulting from the action of said vulcanizing agent on said depolymerized rubber.

WALTER ALEXANDER.